US008178826B2

(12) United States Patent
Ikegami

(10) Patent No.: US 8,178,826 B2
(45) Date of Patent: May 15, 2012

(54) CONTROL OF SEMICONDUCTOR LIGHT EMITTING ELEMENT

(75) Inventor: Tomio Ikegami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 779 days.

(21) Appl. No.: 12/248,669

(22) Filed: Oct. 9, 2008

(65) Prior Publication Data

US 2009/0095879 A1    Apr. 16, 2009

(30) Foreign Application Priority Data

Oct. 10, 2007  (JP) ................... 2007-264001

(51) Int. Cl.
*G01J 1/32* (2006.01)
(52) U.S. Cl. ... 250/205; 362/552; 362/553; 372/29.011; 372/29.014; 372/29.015; 372/38.01; 372/38.02
(58) Field of Classification Search .................. 250/205; 372/29.014, 29.015, 38.01, 38.02, 29.01, 372/29.011; 362/552
See application file for complete search history.

(56) References Cited

U.S. PATENT DOCUMENTS

| 6,243,407 | B1  |         | 6/2001 | Mooradian |
|-----------|-----|---------|--------|-----------|
| 6,345,062 | B1  | *       | 2/2002 | Taguchi et al. ............ 372/38.01 |
| 6,370,175 | B1  | *       | 4/2002 | Ikeda et al. .................. 372/38.1 |
| 7,345,513 | B2  | *       | 3/2008 | Gropper et al. ............... 327/108 |
| 2004/0042514 | A1 | *     | 3/2004 | Nishimura et al. ........ 372/38.02 |

FOREIGN PATENT DOCUMENTS

| JP | 2000-294871 | 10/2000 |
| JP | 2004-163527 | 6/2004 |
| JP | 2005-208231 | 8/2005 |

\* cited by examiner

*Primary Examiner* — Georgia Y Epps
*Assistant Examiner* — Kevin Wyatt
(74) *Attorney, Agent, or Firm* — Maschoff Gilmore & Israelsen

(57) ABSTRACT

A light source device including a semiconductor light emitting element and a control section for controlling the semiconductor light emitting element in accordance with an input value. The control section includes a supply section that supplies the semiconductor light emitting element with a drive current based on the input value and an estimated threshold current of the semiconductor light emitting element, and an estimation section that obtains the estimation of the threshold current using the drive current and the amount of light detected to be emitted from the semiconductor light emitting element.

16 Claims, 10 Drawing Sheets

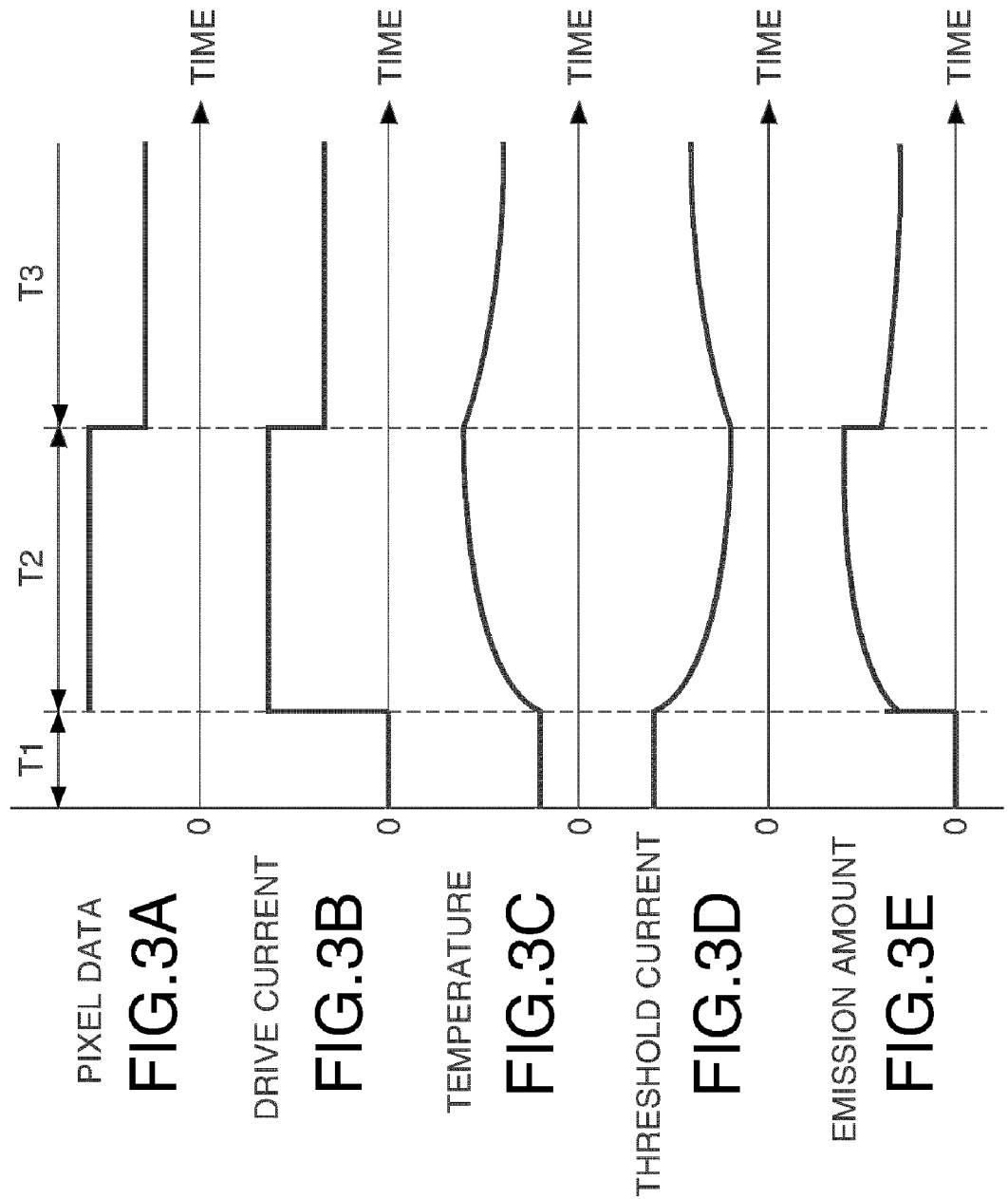

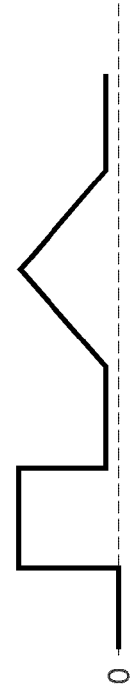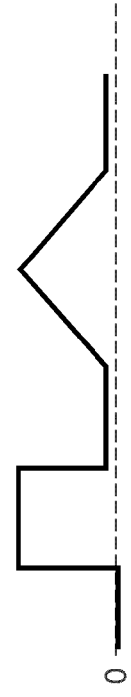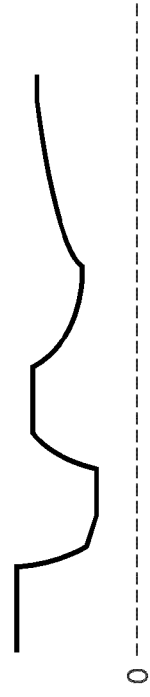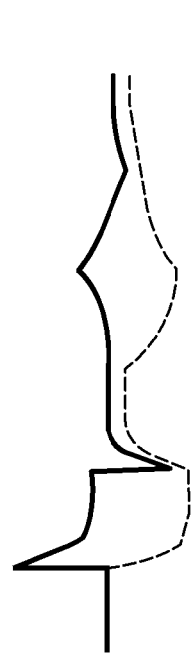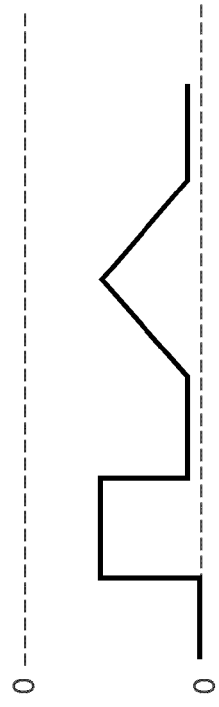
FIG.6A PIXEL DATA D
FIG.6B LIGHT EMISSION CURRENT Id
FIG.6C THRESHOLD CURRENT Ith
FIG.6D DRIVE CURRENT I
FIG.6E EMISSION AMOUNT L

CONTROL OF SEMICONDUCTOR LIGHT EMITTING ELEMENT

CROSS REFERENCES TO RELATED APPLICATIONS

The entire disclosure of Japanese Patent Application No. 2007-264001, filed Oct. 10, 2007 is expressly incorporated herein by reference.

BACKGROUND OF THE INVENTION

1. Technical Field

The present invention relates to a semiconductor. More specifically, the present invention relates to technology for controlling a semiconductor light emitting element.

2. Related Art

Generally, projectors use high-pressure mercury lamps as light sources. In recent years, however, semiconductor lasers have been utilized as the light sources of the projectors. Examples of such projectors are found in Japanese Patent Application No. JP-A-2000-294871 and U.S. Pat. No. 6,243,407.

In the configurations where the semiconductor laser is used, the intensity or amount of light emitted from the semiconductor laser can vary due to heat generation even though the input value thereto is not changed. Unfortunately, this may cause the image displayed by the projector to be different from the original image represented by the original image data. This phenomenon is particularly prominent in configurations where the semiconductor laser uses the thermal lens effect.

It should be noted that the problem described above is not limited to semiconductor lasers but may also occur when other semiconductor light emitting elements, such as a light emitting diodes, are used. Further, the problem described above is not limited to projectors, and may occur in other light source devices, including the semiconductor light emitting elements.

BRIEF SUMMARY OF THE INVENTION

An advantage of some aspects of the invention is to make the semiconductor light emitting element emit which emits light having an intensity which is closely correlated to the input value.

One aspect of the invention is a light source device comprising a semiconductor light emitting element capable of emitting light and a control section for controlling the semiconductor light emitting element in accordance with an input value received by the control section. The control section comprises a supply section capable of supplying the semiconductor light emitting element with a drive current, the drive current being based on the input value and an estimated threshold current of the semiconductor light emitting element, and an estimation section capable of generating the estimated threshold current used by the supply section using the value of the drive current and a detected value related to the amount of light emitted from the semiconductor light emitting element.

A second aspect of the invention is a method of controlling a semiconductor light emitting element in accordance with an input value. The method comprises supplying the semiconductor light emitting element with a drive current based on the input value and an estimation of a threshold current of the semiconductor light emitting element and generating the estimation of the threshold current used to supply the semiconductor light emitting element using the drive current and a detected amount of light emitted form the semiconductor light emitting element.

As previously mentioned, one disadvantage of systems of the prior art is that when the temperature of the semiconductor light emitting element varied, the threshold current of the semiconductor light emitting element would also vary. However, in the present device, since an estimation of the threshold current is obtained, and a drive current is supplied to the semiconductor light emitting element based on the input value and the estimation of the threshold current, it is possible to cause the semiconductor light emitting element to accurately output light having an intensity which corresponds to the input value even when the threshold current varies due to the temperature variation.

It should be noted that the invention can be put into practice in various forms with departing from the meaning or scope of the invention. For example, the invention may be implemented as a light source device, including a semiconductor light emitting element, a control device, and method for a semiconductor light emitting element, an image display device equipped with a light source device, control device and method for the image display device, a computer program for realizing the function of the method or the device, a recording medium recording the computer program, or a data signal including the computer program and realized in a carrier wave.

BRIEF DESCRIPTION OF THE DRAWINGS

The invention will now be described with reference to the accompanying drawings, wherein like numbers reference like elements.

FIG. 3A-3E illustrate the operation of a light source device;

FIG. 6 is a timing chart showing the operation of the light source device;

FIGS. 10A-1 through 10B-3 are explanatory diagrams illustrating the simulation of a light source device according to the second embodiment.

DESCRIPTION OF EXEMPLARY EMBODIMENTS

Some embodiments of the invention will hereinafter be explained based on some specific examples in the following order.

A. First Embodiment
A-1. Configuration of Projector
A-2. Comparative Example
A-3. Configuration of Light Source Device
A-4. Operation of Light Source Device
A-5. Threshold Current Estimator
B. Second Embodiment

A. First Embodiment

A-1. Configuration of Projector

Figure 1:
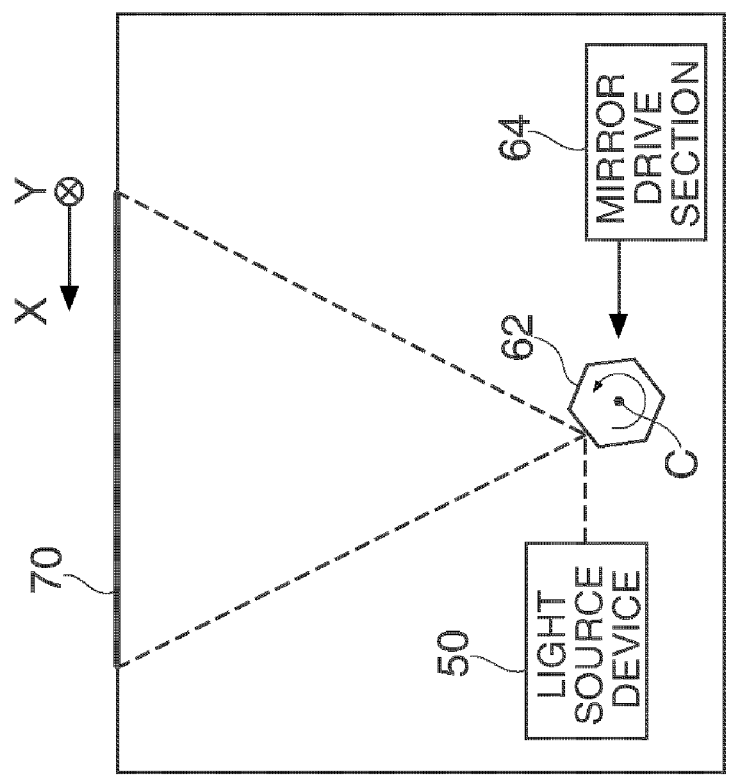
FIG. 1 is an explanatory diagram showing a schematic configuration of a projector.

FIG. 1 is an explanatory diagram showing a schematic configuration of a projector PJ. The projector PJ is a raster scanning type of rear projector. The projector PJ is provided with a light source device 50, a polygon mirror 62, a mirror drive section 64, and a screen 70.

The light source device 50 is provided with a semiconductor laser, which emits a laser beam. Specifically, the light source device 50 emits the light having intensity corresponding to pixel data (pixel data values) in order to form the image data. The polygon mirror 62 includes a plurality of mirror surfaces, and each of the mirror surfaces reflects the light emitted from the light source device 50 towards the screen 70. The mirror drive section 64 rotates the polygon mirror 62 around the center axis C. Therefore, the spot of the light formed on the screen 70 is displayed on the screen 70 along an X direction. Further, the mirror drive section 64 rotates the polygon mirror 62 around an axis which is parallel to the X direction in the drawing. Therefore, the scan line of the spot of the light moves gradually in a Y direction. The screen 70 is a diffusing plate which diffuses the incident light. As a result, the image represented by the image data is displayed on the screen 70. It should be noted that the observer observes the image using the afterimage phenomenon.

Figure 2:
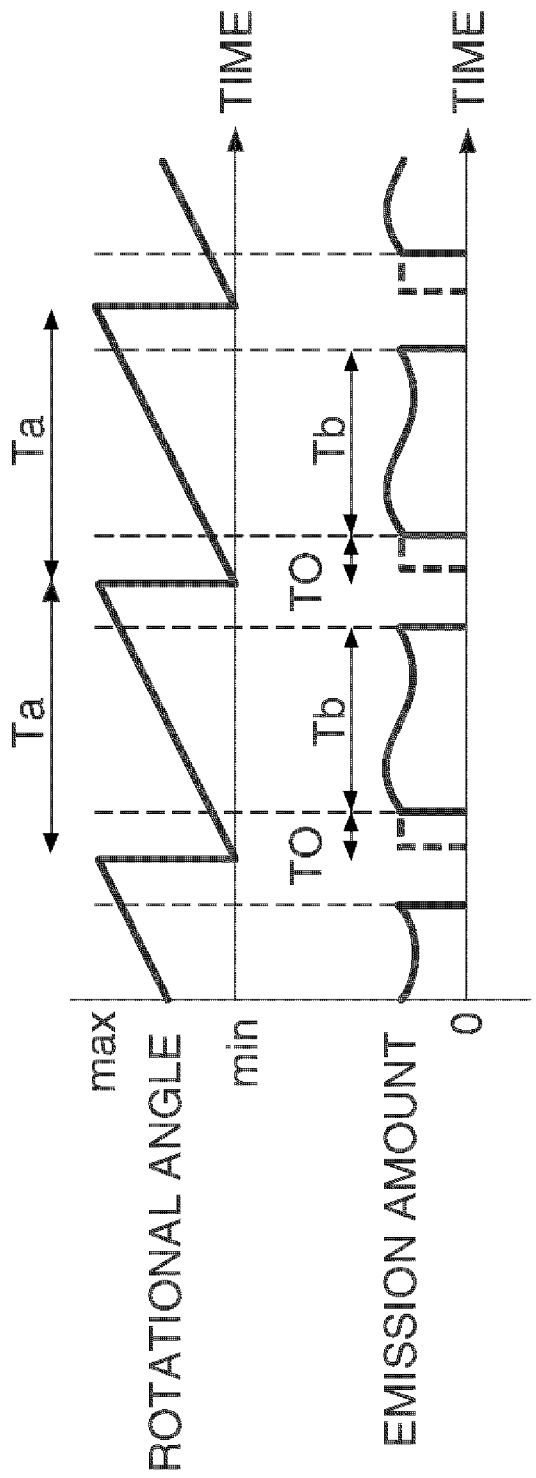
FIG. 2 is an explanatory diagram schematically showing the operation of the projector.

FIG. 2 is an explanatory diagram schematically showing an operation of the projector PJ. The upper part of FIG. 2 shows the rotational angle of the polygon mirror 62, and the lower part of FIG. 2 shows the intensity or amount of light emitted from the light source device 50.

The rotational angle of the polygon mirror 62 shown in the upper part of FIG. 2 represents the surface angle of the object mirror that the light emitted from the light source device 50 is reflected from. In the drawing, a base period Ta represents the period of time that the laser beam reflects from the object mirror surface, assuming that the laser beam is constantly emitted from the light source device 50. The starting point of the base period Ta corresponds to the minimum rotational surface angle of the of the object mirror surface (min), and the end point of the base period Ta corresponds to the maximum value of the rotational surface angle of the object mirror surface (max). In the present embodiment, as shown in the lower part of FIG. 2, the light source device 50 only emits light in an effective period Tb, which is a part of the base period Ta. Therefore, a partial image (a line image) which corresponds to one scan line is drawn as the rotational surface angle of the object mirror increases in the effective period Tb. It should be noted that the period T0 shown in the lower part of FIG. 2 will be described more fully below.

Ideally, in the raster scanning type of projector PJ described above, the intensity of the light emitted from the light source device 50 has an intensity corresponding to the pixel data or pixel value. However, as described above, the intensity of the light emitted from the semiconductor laser can vary depending on the temperature of the semiconductor laser 52. Therefore, the intensity of the light emitted from the light source device 50 can differ in intensity from the pixel data or pixel value.

A-2. Comparative Example

Figures 1, 10A:
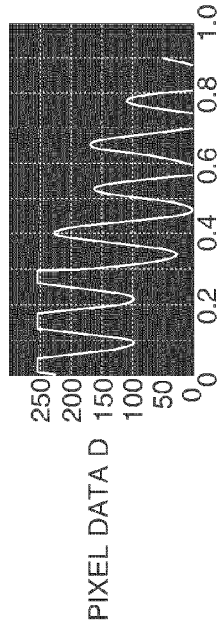
Figures 2, 10A:
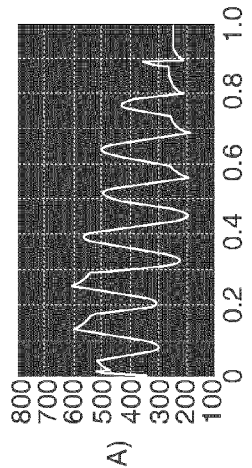
Figures 3, 10A:
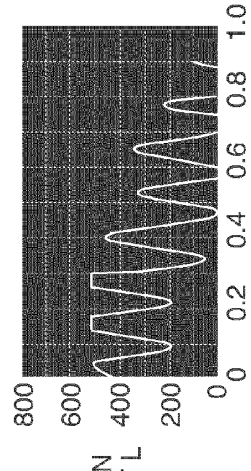

FIG. 3 is a timing chart showing the operation of a light source device. FIG. 3A illustrates the pixel data provided to the light source device. FIG. 3B shows the drive current supplied to the semiconductor laser. FIG. 3C shows the temperature of the semiconductor laser. FIG. 3D shows the threshold current of the semiconductor laser. FIG. 3E shows the intensity of the light emitted from the semiconductor laser.

As shown in FIG. 3A, the amount of pixel data sent to the light source is zero during the period T1. The amount of pixel data sent to the light source is relatively large value during the period T2, and a relatively small value during the period T3. As shown in FIG. 3B, the drive current of the semiconductor laser corresponds to the pixel data. Specifically, the drive current of the semiconductor laser is set to zero during the period T1, a relatively large value during the period T2, a relatively small value during the period T3.

The temperature of the semiconductor laser also corresponds with the drive current, as shown in FIG. 3C. Specifically, the temperature of the semiconductor laser gradually rises during the period T2 after the drive current is set to a significant value, and gradually drops during the period T3 after the drive current has been reduced. Further, as the temperature of the semiconductor laser varies, the threshold current of the semiconductor laser is varies, as shown in FIG. 3D. More specifically, the threshold current of the semiconductor laser decreases as the temperature rises in the period T2, and increases as the temperature drops during the period T3. As a result, the emission amount of the semiconductor laser increases rapidly and then continuously during the period T2, and decreases rapidly and then gradually the period T3, as shown in FIG. 3E.

As previously described, in an ideal configuration, the emission of the semiconductor laser shown in FIG. 3E would match the pixel data shown in FIG. 3A. However, as previously shown in FIGS. 3A-3E, the two profiles differ significantly. This is because the threshold current varies significantly in accordance with the temperature of the semiconductor laser.

When light source devices currently known in the art are used, even where a solid image (an image with even luminance) is to be displayed on the screen, the resulting image may have a luminance distribution. More specifically, it is assumed that each line image of the solid image is drawn from a first side to a second side. When the first side of each of the line images is displayed, the emission amount is relatively small because the temperature of the semiconductor laser is relatively low and the threshold current is relatively high. By the time the second side of each of the line images is drawn, however, the emission amount is relatively large because the temperature of the semiconductor laser is relatively high and the threshold current is relatively low. As a result, the luminance of the first side of the solid image displayed on the screen is lower than the luminance in the second side of the solid image.

Therefore, in the present embodiment, the configuration of the light source device 50 is devised so that the profile of the emission amount is the same or closely corresponds to the profile of the pixel data.

It should be noted that the problem shown in FIGS. 3A-3E becomes prominent when a semiconductor laser using the thermal lens effect is used. More specifically, when the temperature of the semiconductor laser becomes high in accordance with the drive current, the threshold current becomes small, thus the emission amount of the semiconductor laser increases. In comparison, when the temperature of the semiconductor laser becomes low in accordance with the drive current, the threshold current becomes large, thus the emission amount of the semiconductor laser decreases. Here, the thermal lens effect denotes the phenomenon where irradiation of the laser beam causes the temperature of the area to be raised, generating a refractive index distribution.

A-3. Configuration of Light Source Device

Figure 4:
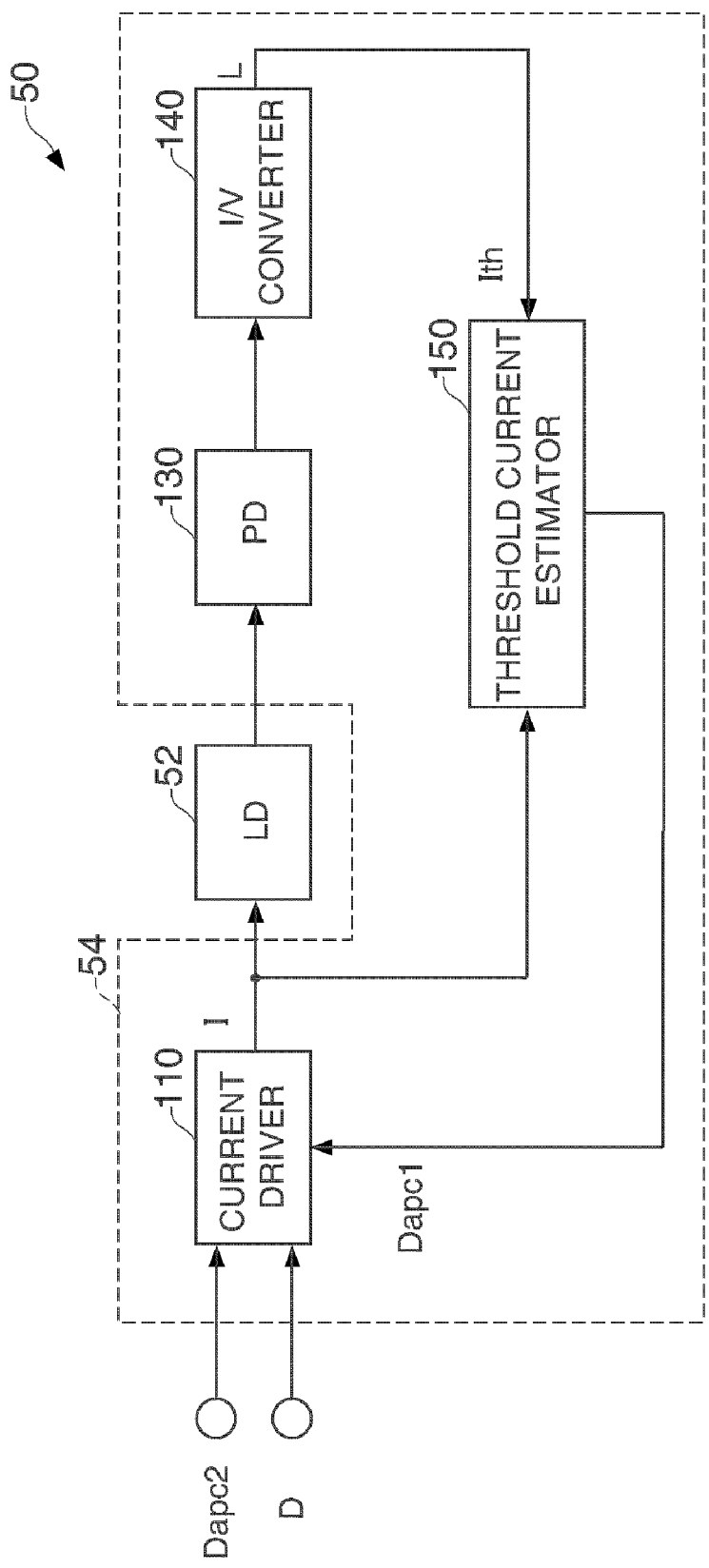
FIG. 4 is an explanatory diagram showing the schematic configuration of a light source device.

FIG. 4 is a schematic configuration of the light source device 50 shown in FIG. 1. As shown in the drawings, the light source device 50 is provided with a semiconductor laser (LD) 52 and a control circuit 54 for controlling the operation of the semiconductor laser 52. The semiconductor laser 52 uses the thermal lens effect. The control circuit 54 is provided with a current driver 110, a light-sensitive element (PD) 130, a current-to-voltage (I/V) converter 140, and a threshold current estimator 150.

The current driver 110 supplies the semiconductor laser 52 with a drive current I corresponding three signals Dapc1, Dapc2, and D. The three signals Dapc1, Dapc2, and D will be described more fully below.

The semiconductor laser 52 emits the laser beam in accordance with the drive current I supplied from the current driver 110.

The light-sensitive element 130 outputs the current corresponding to the intensity (the emission amount) of the light emitted from the semiconductor laser 52.

The I/V converter 140 outputs a voltage corresponding to the current received from the light-sensitive element 130. The voltage output from the I/V converter 140 depends on the intensity of the light emitted from the semiconductor laser 52, also referred to as the "emission amount L."

The threshold current estimator 150 estimates the threshold current Ith of the semiconductor laser 52 using the voltage output from the I/V converter 140 (i.e., the emission amount L) and the drive current I supplied from the current driver 110 to the semiconductor laser 52. The estimated threshold current Ith is fed-back to the current driver 110 in real time as the signal Dapc1.

It should be noted that the control circuit 54 in the present embodiment comprises to a control section of the invention. Further, the current driver 110 comprises a supply section in the invention, and the threshold current estimator 150 comprises an estimator in the invention.

Figure 5:
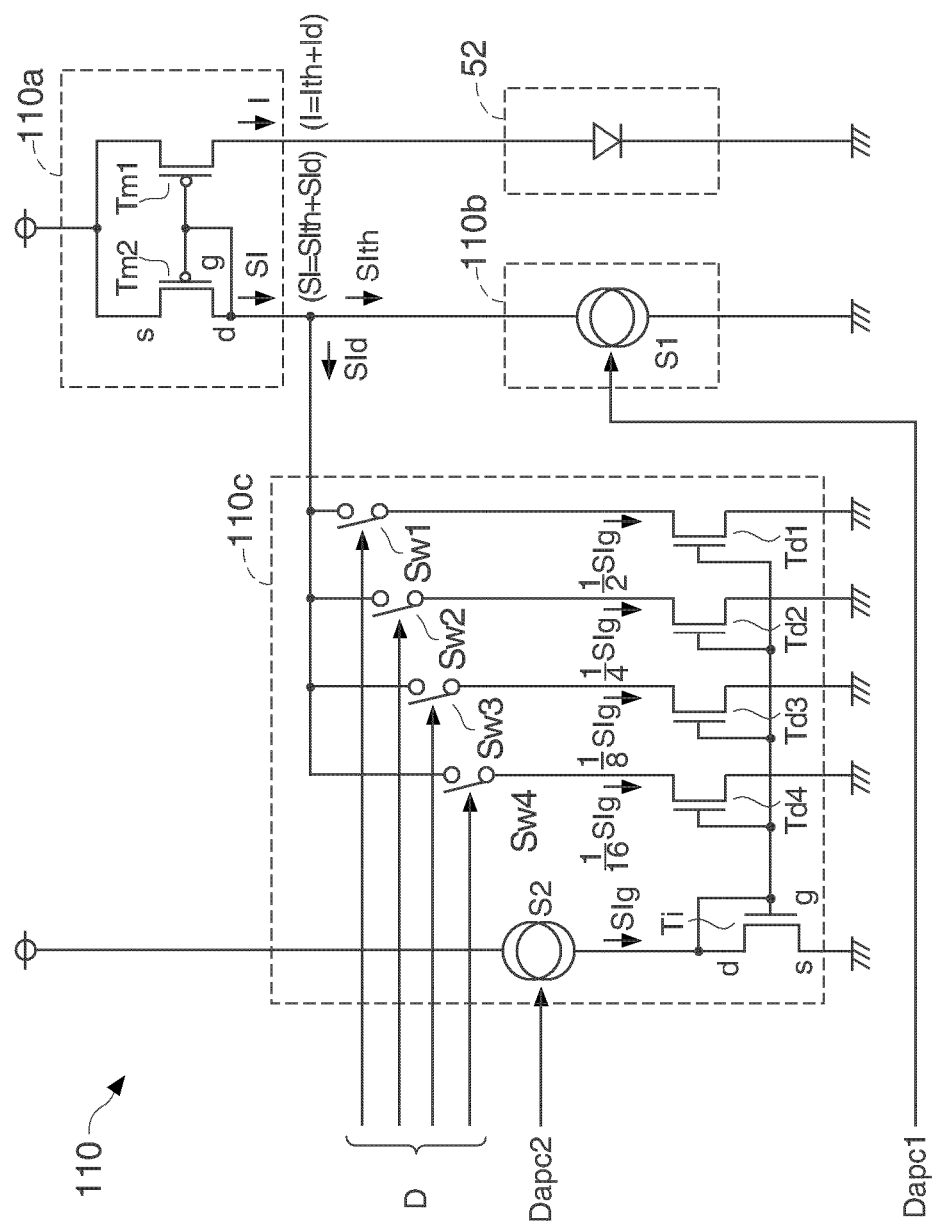
FIG. 5 is an explanatory diagram showing the internal configuration of a current driver.

FIG. 5 is an explanatory diagram showing an internal configuration of the current driver 110 shown in FIG. 4. It should be noted that FIG. 5 also shows the semiconductor laser 52. The current driver 110 is provided with a drive current determination section 110a, a threshold current determination section 110b, and a light emission current determination section 110c.

As is known to one of ordinary skill in the art, the semiconductor laser 52 emits light when the drive current I exceeds the threshold current Ith. In other words, the emission amount L of the semiconductor laser 52 depends on the difference between the drive current I and the threshold current Ith. Therefore, in the present embodiment, the difference between the drive current I and the threshold current Ith is referred to as the "light emission current" Id.

The drive current determination section 110a is provided with a current mirror circuit including two p-MOS transistors Tm1, Tm2. The drain terminal of the first transistor Tm1 is connected to the semiconductor laser 52, and the drain terminal of the second transistor Tm2 is connected to the threshold current determination section 110b and the light emission current determination section 110c.

The threshold current determination section 110b is provided with a constant current source S1. The constant current source S1 is supplied with the signal Dapc1. The constant current source S1 provides a current SIth corresponding to the signal Dapc1. It should be noted that the current SIth corresponds to the threshold current Ith.

The light emission current determination section 110c is provided with a constant current source S2 and an n-MOS transistor Ti connected in series with each other. The constant current source S2 is supplied with the signal Dapc2, and the constant current source S2 provides a current SIg corresponding to the signal Dapc2. It should be noted that in the present embodiment, since the signal Dapc2 is a constant value, the current SIg is a constant value.

Further, the light emission current determination section 110c is provided with four sets of switches Sw1 to Sw4 and n-MOS transistors Td1 to Td4 connected in parallel to each other. It should be noted that the switch (e.g., Sw1) and the transistor (e.g., Td1) of each of the sets are connected in series with each other. The four sets of switches Sw1 to Sw4 and transistors Td1 to Td4 are disposed in parallel to the threshold current determination section 110b. Further, the gate terminals of the four transistors Td1 to Td4 are connected to each other and the gate terminal of the transistor Ti.

The four switches Sw1 to Sw4 are provided with the pixel data D composed of four bits. It should be noted that although the pixel data D is composed of four bits in FIG. 5, it is also possible to form the pixel data D with a fewer number of bits or with a larger number of bits. In such cases, it is sufficient to provide the corresponding number of sets of switches and the transistors to the number of bits of the pixel data D.

When each of the switches Sw1 to Sw4 is set to the ON state in accordance with the pixel data D, the current flows through the corresponding transistors Td1 through Td4. When the first switch Sw1 is set to the ON state in accordance with the first bit (the most significant bit) of the pixel data D, a current of $\frac{1}{2} \cdot SIg$ flows through the first transistor Td1. Similarly, when the second switch Sw2 is set to the ON state in accordance with the second bit of the pixel data D, a current of $\frac{1}{4} \cdot SIg$ flows through the second transistor Td2. When the third switch Sw3 is set to the ON state in accordance with the third bit of the pixel data D, a current of $\frac{1}{8} \cdot SIg$ flows through the third transistor Td3. When the fourth switch Sw4 is set to the ON state in accordance with the fourth bit (the least significant bit) of the pixel data D, a current of $\frac{1}{16} \cdot SIg$ flows through the fourth transistor Td4.

The current SId, which is the sum of the currents flowing through the four transistors Td1 through Td4, is at a maximum ($\frac{15}{16} \cdot SIg$) when all of the switches Sw1 to Sw4 are set to the ON state. It should be noted that the current SId corresponds to the light emission current Id.

The current SI, which is the sum of the current SIth supplied to the threshold current determination section 110b and the current SId supplied to the light emission current determination section 110c, flows through the second transistor Tm2 of the drive current determination section 110a. In the present embodiment, since the two transistors Tm1, Tm2 have the same size (L (channel length)/W (channel width)), the drive current I having the same value as the current S1 flows through the first transistor Tm1. Further, the drive current I is supplied to the semiconductor laser 52. It should be noted that the sizes (L/W) of the two transistors Tm1, Tm2 can be different from each other.

As described above, the drive current I is determined using the current SIth corresponding to the threshold current Ith and the current SId corresponding to the light emission current Id. The current SIth corresponding to the threshold current Ith is determined in accordance with the signal Dapc1. The current SId corresponding to the light emission current Id is determined in accordance with the two signals Dapc2, D. It should be noted that since in the present embodiment, the signal Dapc2 stays in the constant value, it can be said that the current SId corresponding to the light emission current Id is determined in accordance with the signal D.

By adopting the configuration shown in FIG. 5, the current driver 110 is capable of supplying the semiconductor laser 52 with the drive current I including the threshold current Ith and the light emission current Id exceeding the threshold current Ith.

It should be noted that the threshold current determination section 110b comprises a first circuit of the invention, and the light emission current determination section 110c comprises a second circuit of the invention.

As explained with reference to FIGS. 4 and 5, the light source device 50 estimates the threshold current Ith using the drive current I and the emission amount L, and sends the estimated threshold current Ith to the current driver 110 in real time. Further, the current driver 110 determines the drive current I based on the pixel data D and the estimated threshold current Ith. According to the present configuration, the semiconductor laser 52 can emit the laser beam with the emission amount L corresponding to the light emission current Id.

It should be noted that an operation band of the threshold current estimator 150 which corresponds to a response speed that is higher than the temperature response of the semiconductor laser 52 is sufficient. For example, in the case in which the temperature response speed of the semiconductor laser 52 is several tens of microseconds, it is sufficient to use a threshold current estimator 150 with an operation band of several microseconds (several hundreds kHz).

A-4. Operation of Light Source Device

FIG. 6 illustrates the operation of the light source device 50. FIG. 6A shows the pixel data D provided to the current driver 110. FIG. 6B shows the light emission current Id corresponding to the pixel data D determined by the light emission current determination section 110c. FIG. 6C shows the threshold current Ith of the semiconductor laser 52 estimated by the threshold current estimator 150. FIG. 6D shows the drive current I supplied from the current driver 110 to the semiconductor laser 52. It should be noted that the threshold current Ith shown in FIG. 6C is also shown in FIG. 6D as a broken line. FIG. 6E shows the emission amount L of the semiconductor laser 52.

When the pixel data D varies as shown in FIG. 6A, the light emission current Id varies in accordance with the pixel data D. As described above, the threshold current Ith of the semiconductor laser 52 can vary in accordance with the temperature of the semiconductor laser. The threshold current Ith varies as, for example, shown FIG. 6C. Since the drive current I is represented by the sum of the threshold current Ith, shown in FIG. 6C, and the light emission current Id, shown in FIG. 6B, the semiconductor laser 52 is provided with the drive current I, as shown in FIG. 6D. As a result, the semiconductor laser 52 emits the light with the emission amount L shown in FIG. 6E.

As described above, since the drive current I, which is the sum of the threshold current Ith and the light emission current Id corresponding to the pixel data D, is supplied to the semiconductor laser 52 in the present embodiment, it is possible to make the profile of the pixel data D shown in FIG. 6A and the profile of the emission amount L, shown in FIG. 6E, equivalent to each other.

A-5. Threshold Current Estimator

In order to configure the threshold current estimator 150, an operation model of the semiconductor laser 52 is first considered.

The rate equation of the semiconductor laser is represented by the following formulas:

$$\frac{dN}{dt} = \frac{I}{e}\frac{1}{V} - \frac{N}{\tau_c} - A(N - N_c)P \tag{1}$$

$$\frac{dP}{dt} = A(N - N_c)P - \frac{P}{\tau_p} \tag{2}$$

Here, I denotes the current or drive current injected into the light emitting region or active region. e denotes a charge and V denotes the volume of the light emitting region. N denotes the density of the carriers injected into the light emitting region, and Nc denotes the carrier density for amplifying the light. More specifically, Nc is a specific carrier density, such that when the injected carrier density N is equal to or greater than Nc, the light is amplified. The symbol τc denotes the relaxation time of the carriers, or the amount of time needed to release the carrier density. The symbol P denotes the photon density of the active region. The symbol τp denotes the relaxation time, or the amount of time needed to release the photon density. The symbol A denotes a coefficient related to the stimulated emission.

Formula 1 shows that the temporal variation of the number of carriers is obtained by subtracting the number of carriers lost by the relaxation and the number of the carriers contributing to the effective stimulated emission from the number of the carriers corresponding to the injected current. Formula 2 shows that the temporal variation of the number of photons is obtained by subtracting the number of photons lost by the relaxation from the number of the photons generated by the effective stimulated emission.

The photon density P in the steady state is represented as the following formula:

$$P = G(I - I_{th}) \tag{3}$$

$$I_{th} = \frac{e \cdot V}{\tau_c}\left(\frac{1}{A \cdot \tau_p} + N_c\right)$$

$$G = \frac{\tau_p}{e \cdot V}$$

Next, the thermal lens effect of the semiconductor laser will be considered. Assuming that the photon density in the light emitting region increases due to the thermal lens effect, the rate equation is represented by the following formulas. It should be noted that the following formulas are obtained by replacing the coefficient A related to the stimulated emission in Formulas 1 and Formula 2 with the coefficient A·F. Here, the coefficient F is a coefficient related to the effect of the thermal lens.

$$\frac{dN}{dt} = \frac{I}{e}\frac{1}{V} - \frac{N}{\tau_c} - A(N - N_c)F \cdot P \tag{4}$$

$$\frac{dP}{dt} = A(N - N_c)F \cdot P - \frac{P}{\tau_p} \tag{5}$$

Further, the photon density P in the steady state is represented by the following formula, Formula 6. It should be noted that Formula 6 is obtained by replacing the coefficient A in the formula 3 with the coefficient A·F.

$$P = G(I - I_{th}) \qquad (6)$$

$$I_{th} = \frac{eV}{\tau_c}\left(\frac{1}{A \cdot F \cdot \tau_p} + N_c\right)$$

$$G = \frac{\tau_p}{e \cdot V}$$

Since the coefficient F is a coefficient related to the effect of the thermal lens, when the thermal lens effect becomes large in association with increase in the drive current I, the value of the coefficient F becomes large and the threshold current Ith becomes small. By contrast, when the thermal lens effect is reduced in association with decrease in the drive current I, the value of the coefficient F becomes small, and the threshold current Ith becomes large.

Incidentally, taking the proportion of the light emitted from the light emitting region and the sensitivities of the light-sensitive element 130 and the I/V converter 140 into consideration, the emission amount L of the semiconductor laser is represented by the following formula using the coefficient M:

$$L = M(I - I_{th}) \qquad (7)$$

The resulting temperature of the light emission region corresponding to the drive current I is represented by the following formula, which assumes that a calorific value Q is proportional to the drive current I:

$$Q = a \cdot I \qquad (8)$$

$$= C\frac{d\theta}{dt} + k \cdot \theta$$

Here, the symbol a denotes a coefficient. Further, $\theta$ denotes the temperature of the light emitting region, C denotes the calorific capacity of the light emitting region, and k denotes a heat conduction coefficient.

Assuming that $\tau = C/k$, the following formula is obtained from Formula 8:

$$\tau\frac{d\theta}{dt} + \theta = \frac{a}{k}I \qquad (9)$$

The threshold current Ith depends on the thermal lens effect, coefficient F (see Formula 6), and the thermal lens effect depends on the temperature of the light emitting region. Therefore, the threshold current Ith depends on the temperature of the light emitting region. Assuming that the threshold current Ith is a direct function of the temperature $\theta$ of the light emitting region, the following Formula 10 is obtained. Note that m and n are constants.

$$\theta = -m \cdot I_{th} + n \qquad (10)$$

By substituting Formula 10 for $\theta$ in Formula 9, Formula 11 is obtained. Note that $\alpha$ and $\beta$ are constants.

$$\frac{dI_{th}}{dt} = \frac{-I_{th} + \alpha - \beta I}{\tau} \qquad (11)$$

$$\alpha = \frac{n}{m}$$

$$\beta = \frac{a}{m \cdot k}$$

The constants $\alpha$ and $\beta$ are obtained by measuring a current-emission amount. Specifically, when the semiconductor laser 52 is provided with a direct current to emit light, the right side of Formula 11 is equal to zero. Therefore, Ith=$\alpha$–$\beta$·I is satisfied. Therefore, when the semiconductor laser 52 is made to emit light with the direct current, Formula 12 is satisfied (see Formula 7). Further, when the semiconductor laser 52 is made emit light with the alternating current, more specifically, in the case in which the semiconductor laser is made to strobe or emit light in a shorter time cycle than the temperature response time of the semiconductor laser 52, Formula 13 is satisfied (see formula 7).

$$L_{dc} = M\{I - (\alpha - \beta I)\} \qquad (12)$$
$$= M\{(1+\beta)I - \alpha\}$$
$$= M(1+\beta)\left(I - \frac{\alpha}{1+\beta}\right)$$

$$L_{ac} = M(I - I_{th}) \qquad (13)$$

By executing measurement of the current-emission amount in the direct current and the alternating current, the constants $\alpha$, $\beta$ can be obtained using the formulas 12 and 13.

In the present embodiment, the threshold current estimator 150 is configured using an observer in modern control theory. From the result of the study using numerical calculation, it has been known that the accuracy of the parameter a described above has a significant influence on the estimation accuracy of the threshold current Ith. Therefore, in the present embodiment, an observer is configured as follows.

The threshold current Ith and the parameter a are selected as state variables. Further, the scaled state variables are hereinafter used so that the estimated values of the threshold current Ith can be fed-back directly to the current driver 110.

The output current I or drive current of the current driver 110 can be represented by Formula 14 using the constants H1, H2. It is assumed that the scaled current values are u=I/H1, x=Ith/H1. In this case, Formula 15 can be obtained from Formula 14.

$$I = H1 \cdot Dapc1 + H2 \cdot Dapc2 \cdot D \qquad (14)$$

$$u = Dapc1 + \frac{H2}{H1} \cdot Dapc2 \cdot D \qquad (15)$$

Further, Formula 16 is obtained from Formula 7, and Formula 17 is obtained from Formula 11. Note that M1=M·H1, and $\alpha$1=$\alpha$/H1.

$$L = M \cdot H1\left(\frac{I}{H1} - \frac{I_{th}}{H1}\right) \qquad (16)$$
$$= M1(u - x)$$
$$\therefore y = L = M1(u - x)$$

$$\frac{1}{H1}\frac{dI_{th}}{dt} = \frac{-\frac{I_{th}}{H1} + \frac{\alpha}{H1} - \beta\frac{I}{H1}}{\tau} \qquad (17)$$
$$\therefore \frac{dx}{dt} = \frac{-x + \alpha 1 - \beta u}{\tau}$$

Assuming that the state variables are $[x, \alpha 1]^T$, the state equation of the plant can be represented by Formula 18 using Formulas 16 and 17. It should be noted that the plant includes the semiconductor laser 52 shown in FIG. 4, the light-sensitive element 130, and the I/V converter 140.

$$\dot{w} = Aw + Bu \quad (18)$$

$$y = Cw + Du$$

$$w = \begin{bmatrix} x \\ \alpha 1 \end{bmatrix}$$

$$A = \begin{bmatrix} -\frac{1}{\tau} & \frac{1}{\tau} \\ 0 & 0 \end{bmatrix}, \quad B = \begin{bmatrix} -\frac{1}{\tau} \\ 0 \end{bmatrix}$$

$$C = [-M1 \quad 0], \quad D = M1$$

By configuring the observer, namely the threshold current estimator 150, using the state equation of Formula 18, the threshold current Ith can be corrected. Specifically, the threshold current estimator 150 can be represented by Formula 19.

$$\dot{\hat{w}} = A\hat{w} + Bu - F(y - \hat{y}) \quad (19)$$

$$\hat{y} = C\hat{w} + Du$$

$$\hat{w} = \begin{bmatrix} \hat{x} \\ \hat{\alpha}1 \end{bmatrix}$$

$$A = \begin{bmatrix} -\frac{1}{\tau} & \frac{1}{\tau} \\ 0 & 0 \end{bmatrix}, \quad B = \begin{bmatrix} -\frac{1}{\tau} \\ 0 \end{bmatrix}$$

$$C = [-M1 \quad 0], \quad D = M1$$

$$F = \begin{bmatrix} \frac{f}{\tau} \\ \frac{f_0}{\tau} \end{bmatrix}$$

Note that "^" in the formula denotes the estimated value of the variable. The elements f/τ, f0/τ are feed-back coefficients.

Figure 7:
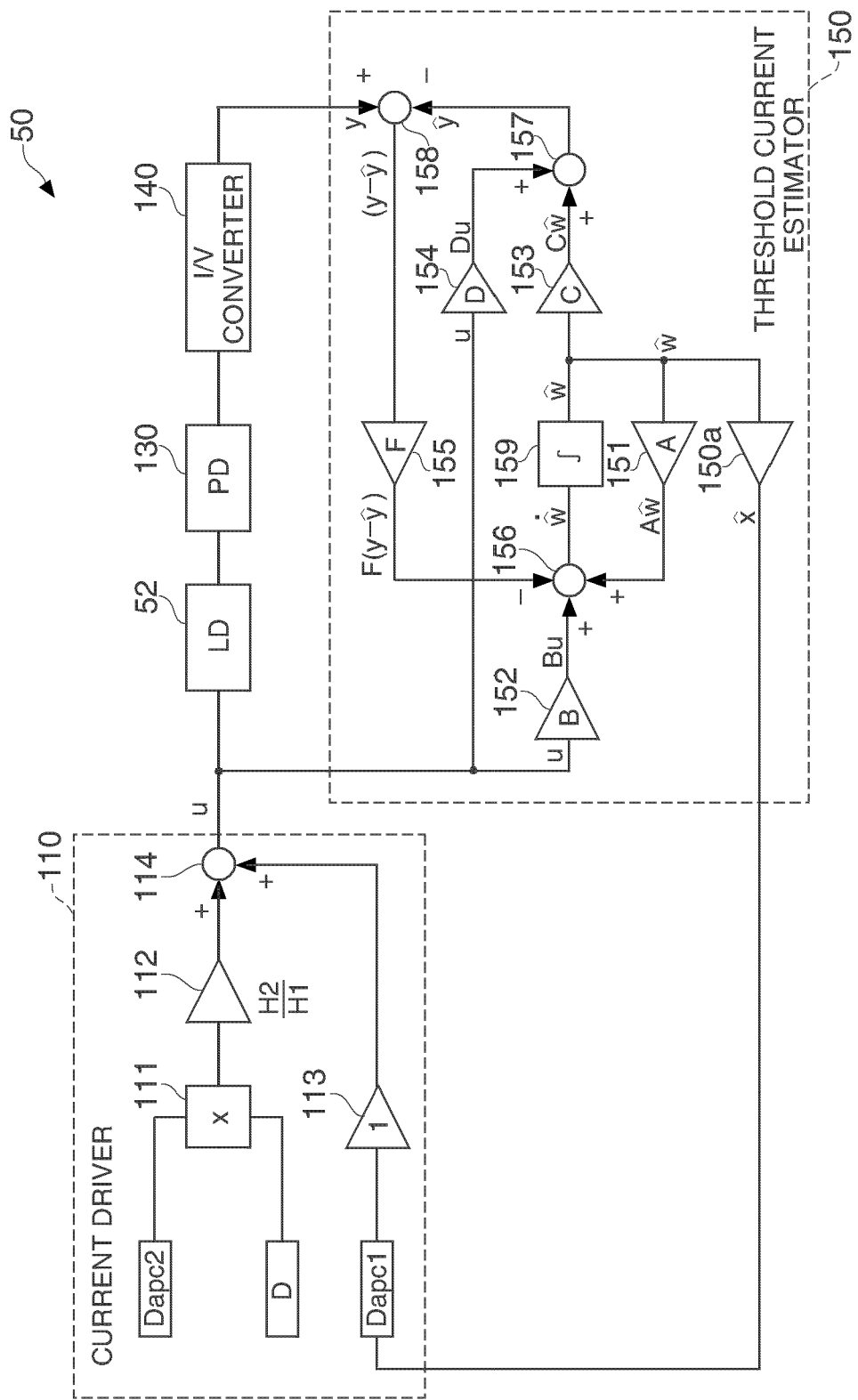
FIG. 7 is an explanatory diagram showing an exemplary configuration of the light source device.

FIG. 7 is a diagram showing a specific configuration of the light source device 50. It should be noted that FIG. 7 is obtained by redrawing FIG. 4 using Formulas 15 and 19. More specifically, the current driver 110 is represented by Formula 15, and the threshold current estimator 150 is represented by Formula 19.

The current driver 110 includes a multiplier 111, two amplifiers 112, 113, and an adder 114. The multiplier 111 multiplies the two signals Dapc2, D, and outputs the signal Dapc2·D. The first amplifier 112 amplifies the signal Dapc2·D to H2/H1 times as large in order to output the signal H2/H1·Dapc2·D. The second amplifier 113 amplifies the signal Dapc1 to the same value. The adder 114 adds the two signals H2/H1·Dapc2·D and Dapc1, which are output from the two amplifiers 112, 113, respectively. As a result, the signal u represented by the formula 15 is output form the adder 114.

It should be noted that the second amplifier 113, which is provided in the present embodiment, can be eliminated.

The threshold current estimator 150 includes five amplifiers 151 to 155, three computing units 156 to 158, an integrator 159, and an extractor 150a.

The integrator 159 integrates the signal d(w^)/dt to output the signal w^.

The first amplifier 151 amplifies the signal w^ A times to output the signal A·w^. The second amplifier 152 amplifies the signal u B times to output the signal B·u. The third amplifier 153 amplifies the signal w^ C times to output the signal C·w^. The fourth amplifier 154 amplifies the signal u D times to output the signal D·u. The fifth amplifier 155 amplifies the signal (y−y^) F times to output the signal F·(y−y^).

The first computing unit 156 adds the signals A·w^ and B·u, and then subtracts the signal F·(y−y^), thereby outputting the signal d(w^)/dt represented by Formula 19. The second computing unit 157 adds the signals C·w^ and D·u to each other to output the signal y^ represented by Formula 19. The third computing unit 158 subtracts the signal y^ from the signal y to output the signal (y−y^). It should be noted that the signal y represents the measured value of the emission amount L, and the signal y^ represents the estimated value of the emission amount L (see Formula 16).

The extractor 150a extracts the signal x^ from the signal w^, and feeds-back the signal x^ to the current driver 110 as the signal Dapc1.

When substituting the contents of the coefficients A to D, and F for the coefficients A to D, and F in Formula 19, Formula 20 can be obtained. Further, when developing Formula 20, Formula 21 can be obtained.

$$\dot{\hat{w}} = \begin{bmatrix} \dot{\hat{x}} \\ \dot{\hat{\alpha}}1 \end{bmatrix} \quad (20)$$

$$= \begin{bmatrix} -\frac{1}{\tau} & \frac{1}{\tau} \\ 0 & 0 \end{bmatrix} \begin{bmatrix} \hat{x} \\ \hat{\alpha}1 \end{bmatrix} + \begin{bmatrix} -\frac{\beta}{\tau} \\ 0 \end{bmatrix} u - \begin{bmatrix} \frac{f}{\tau} \\ \frac{f_0}{\tau} \end{bmatrix} (y - \hat{y})$$

$$\hat{y} = [-M1 \quad 0] \begin{bmatrix} \hat{x} \\ \hat{\alpha}1 \end{bmatrix} + M1 \cdot u$$

$$\dot{\hat{x}} = \frac{1}{\tau}(\hat{\alpha}1 - \hat{x}) - \frac{\beta}{\tau}u - \frac{f}{\tau}(y - \hat{y}) \quad (21)$$

$$\dot{\hat{\alpha}}1 = -\frac{f_0}{\tau}(y - \hat{y})$$

$$\hat{y} = M1(u - \hat{x})$$

Figure 8:
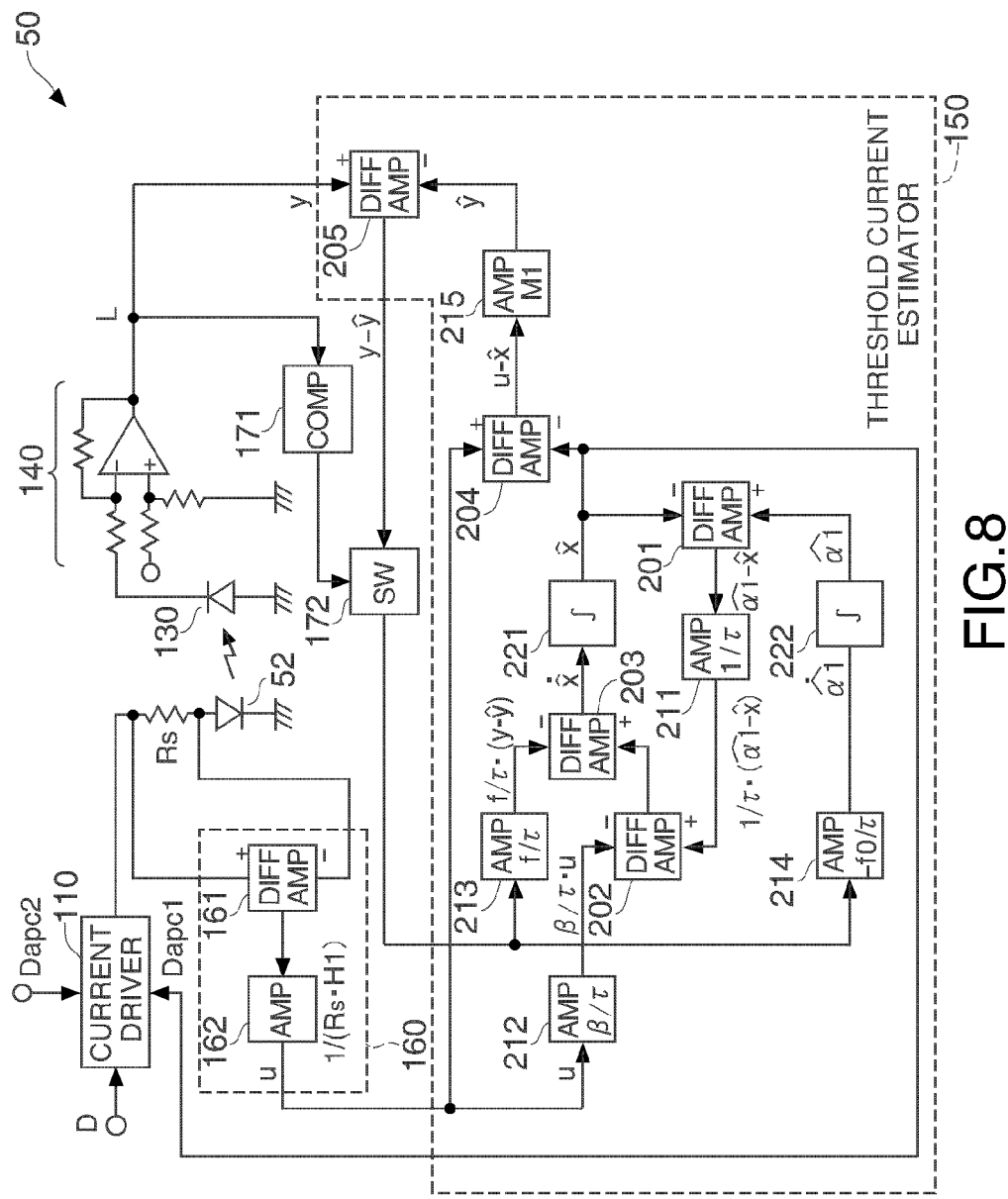
FIG. 8 is an explanatory diagram showing a circuit diagram of a light source device.

FIG. 8 illustrates a circuit diagram of the light source device 50. It should be noted that FIG. 8 is obtained by redrawing FIG. 4 using Formula 21.

As shown in the drawing, the light source device 50 is provided with a drive current measurement section 160 for measuring the drive current I (the signal u) supplied to the semiconductor laser 52. The drive current measurement section is provided with a differential amplifier 161 and an amplifier 162. The two terminals of the differential amplifier 161 are connected to both ends of a resistor Rs connected to the anode of the semiconductor laser 52. The differential amplifier 161 receives the voltage of the both ends of the resistor Rs, and outputs the difference in voltage between each of the ends. It should be noted that the difference in voltage is represented by I·Rs. The amplifier multiplies the difference in voltage 1/(Rs·H1) times. As a result, the multiplier 162 outputs the signal I/H1, namely the signal u.

The threshold current estimator 150 includes five differential amplifiers 201-205, five amplifiers 211-215, and two integrators 221 and 222.

The first integrator 221 integrates the signal d(x^)/dt to output the signal x^. The second integrator 222 integrates the signal d(α1^)/dt to output the signal α1^.

The first differential amplifier 201 subtracts the signal x^ from the signal α1^ to output the signal (α1^−x^). The first amplifier 211 amplifies the signal (α1^−x^) 1/τ times to output the signal 1/τ·(α1^−x^). The second amplifier 212 amplifies the signal u β/τ times to output the signal β/τ·u. The second differential amplifier 202 subtracts the signal β/τ·u from the signal 1/τ·(α1^−x^) to output the signal [1/τ·(α1^−x^)−β/τu]. The third amplifier 213 amplifies the signal (y−y^)f/τ times to output the signal f/τ·(y−y^). The third differential amplifier 203 subtracts the signal f/τ·(y−y^) from the signal [1/τ·(α1^−x^)−β/τ·u] to output the signal d(x^)/dt represented by Formula 21.

The fourth amplifier 214 amplifies the signal (y−y^)−f0/τ times to output the signal d(α1^)/dt represented by Formula 21.

The fourth differential amplifier 204 subtracts the signal x^ from the signal u to output the signal (u−x^). The fifth amplifier 215 amplifies the signal (u−x^) M1 times to output the signal y^ represented by Formula 21.

The fifth differential amplifier 205 subtracts the signal y^ from the signal y to output the signal (y−y^).

As describe above, since the threshold current estimator 150 uses the two state variables x, α1, the threshold current estimator 150 is provided with the first integrator 221 for integrating the signal d(x^)/dt, which is the derivative of the signal x^ to obtain the signal x^, and the second integrator 222 for integrating the signal d(α1^)/dt, which is the derivative of the signal α1^ to generate the signal α1^. The threshold current estimator 150 generates the signal y^ using the signal u and the signal x^ output from the first integrator 221. Further, the threshold current estimator 150 generates the signal d(α1^)/dt provided to the second integrator 222 using the signal (y−y^). Further, the threshold current estimator 150 generates the signal d(x^)/dt provided to the first integrator 221 using the signal u, the signal (y−y^), the signal x^ output from the first integrator 221, and the signal α1^ output from the second integrator 222.

As described above, by using the two state variables x, α1, the estimated value x^ of the threshold current can accurately be generated.

The light source device 50 further includes a comparator 171 and a switch 172. The comparator 171 compares the signal y (the emission amount L) with zero. If the signal y is equal to or greater than zero, the comparator 171 sets the switch 172 to the ON state. On this occasion, the switch 172 transmits the output of the differential amplifier 205, namely the signal (y−y^). On the other hand, if the signal y is less than zero, the comparator 171 sets the switch 172 to the OFF state. On this occasion, the switch 172 does not transmit the output (the signal (y−y^)) of the differential amplifier 205, and the output is zero.

Since the signal (y−y^) is not accurate during the non-emission period of the semiconductor laser 52, it is not preferable to send the signal (y−y^) to the two integrators 221, 222 of the threshold current estimator 150. Therefore, in the non-emission period, the feed-back loop is cut using the comparator 171 and the switch 172. As a result, in the non-emission period, the threshold current estimator 150 is only provided with the measurement value (u) of the drive current I. Further, the threshold current estimator 150 obtains the estimated value x^ of the threshold current Ith in an open-loop manner.

As described above, since the feeding-back of the signal (y−y^) to the input of the threshold current estimator 150 is blocked in the non-emission period, the threshold current estimator 150 can obtain the estimated value x^ of the threshold current in an open-loop manner.

It should be noted that the comparator 171 and the switch 172 in the present embodiment comprise an inhibit section.

Incidentally, in the case in which the non-emission period is long, an error of the estimated value (x^) of the threshold current, more specifically, the difference between the actual value (x) and the estimated value (x^) of the threshold current gradually increases. However, when the semiconductor laser 52 starts emitting light again, the threshold current estimator 150 can output the correct estimated value (x^). It should be noted that a certain period of time (the recovery time) is required before the threshold current estimator 150 outputs the correct estimated value (x^). Taking the recovery time into consideration, in the present embodiment, as shown in FIG. 2, an extra period T0 is provided immediately before the effective period Tb. It should be noted that the extra period T0 has a length equal to or greater than the recovery time. In the present embodiment, the control circuit 54 preliminary supplies the current driver 110 with the drive current I in the extra period T0, thereby making the semiconductor laser 52 preliminary emit light. Thus, the threshold current estimator 150 can output the correct estimated value (x^) in the entire period including the starting period of the effective period Tb. It should be noted that it is sufficient to mask the light emitted from the semiconductor laser 52 in the extra period T0 so as to prevent the light from being guided to the screen 70.

As described above, by making the semiconductor laser 52 preliminary emit light right before making the semiconductor laser 52 start a significant emission, it becomes possible to obtain the estimated value x^ of the threshold current correctly right after the semiconductor laser 52 starts the significant emission.

As explained hereinabove, in the present embodiment, since the estimated value x^ of the threshold current is obtained, and the drive current u determined using the pixel data D and the estimated value x^ of the threshold current is supplied to the semiconductor laser 52, it is possible to make the semiconductor laser 52 accurately emit the light having intensity (emission amount) corresponding to the pixel data D even when the actual threshold current varies due to the temperature variation.

B. Second Embodiment

In the second embodiment, the threshold current estimator 150B comprises a digital circuit. By converting Formula 19 into a discrete-time system with sampling interval Ts using the trapezoidal approximation, Formula 22, which corresponds to Formula 20 can be obtained. Further, when developing Formula 22, Formula 23, which corresponds to Formula 21 can be obtained.

$$\hat{W}_{k+1} = \begin{bmatrix} 1 - \frac{T_s}{\tau_{obs}} & \frac{T_s}{\tau_{obs}} \\ 0 & 1 \end{bmatrix} \hat{W}_k + \begin{bmatrix} -\frac{\beta \cdot T_s}{\tau_{obs}} \\ 0 \end{bmatrix} U_k - \begin{bmatrix} \frac{f \cdot T_s}{\tau_{obs}} \\ \frac{f_0 \cdot T_s}{\tau_{obs}} \end{bmatrix} (Y_k - \hat{Y}_k) \quad (22)$$

$$\hat{Y}_k = [-M1 \quad 0]\hat{W}_k + M1 \cdot U_k$$

$$\hat{W}_k = \begin{bmatrix} \hat{X}_k \\ \hat{X}0_k \end{bmatrix}$$

$$\hat{X}_{k+1} = \left(1 - \frac{T_s}{\tau_{obs}}\right)\hat{X}_k + \frac{T_s}{\tau_{obs}}\hat{X}0_k - \frac{\beta \cdot T_s}{\tau_{obs}}U_k - \frac{f \cdot T_s}{\tau_{obs}}(Y_k - \hat{Y}_k) \quad (23)$$

$$= \hat{X}_k + \frac{T_s}{\tau_{obs}}(\hat{X}0_k + \hat{X}_k - \beta \cdot U_k) - \frac{f \cdot T_s}{\tau_{obs}}(Y_k - \hat{Y}_k)$$

$$\hat{X}0_{k+1} = \hat{X}0_k - \frac{f_0 \cdot T_s}{\tau_{obs}}(Y_k - \hat{Y}_k)$$

$$\hat{Y}_k = M1(U_k - \hat{X}_k)$$

Figure 9:
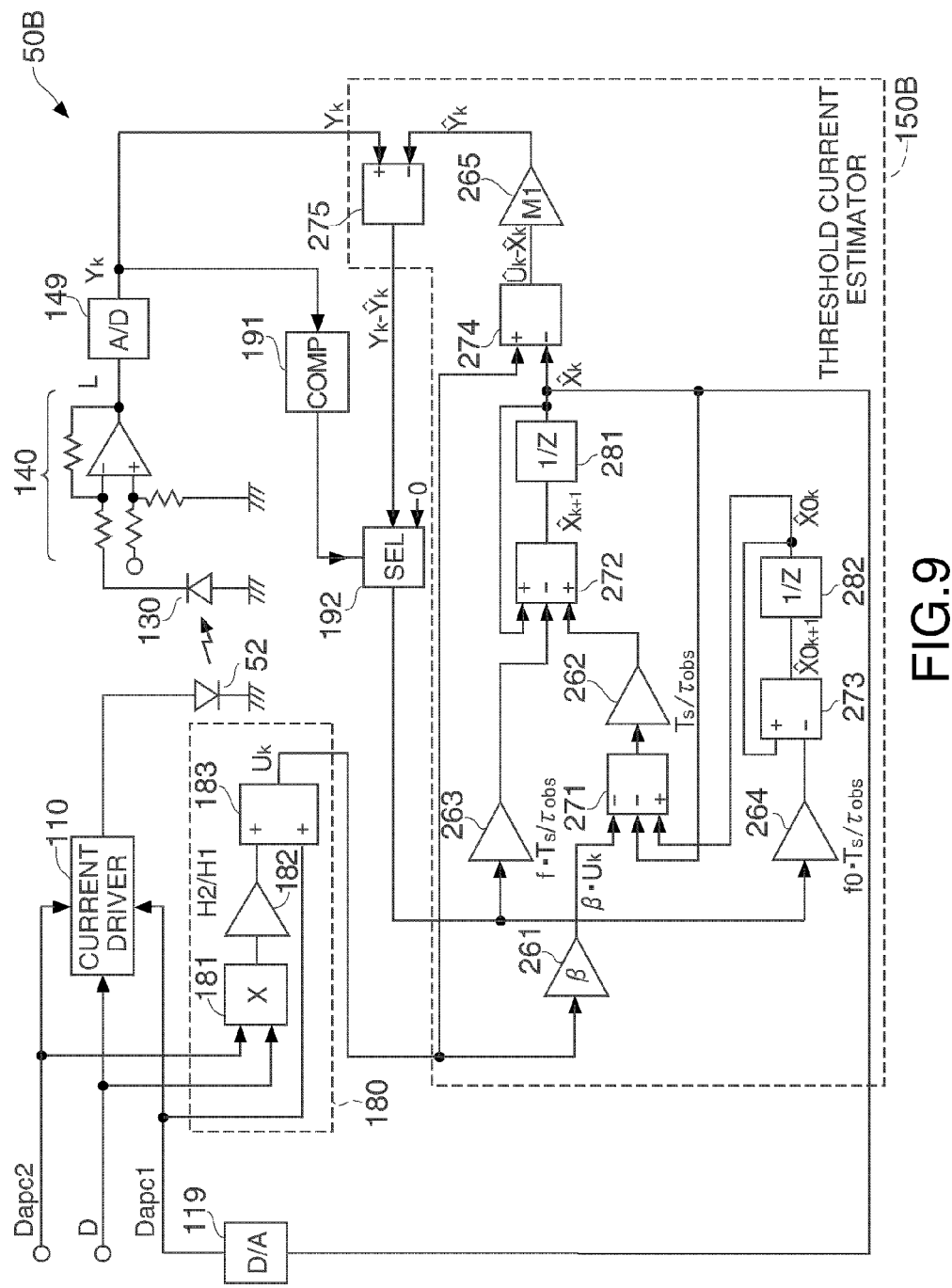
FIG. 9 is an explanatory diagram showing a circuit diagram of a light source device according to a second embodiment.

FIG. 9 illustrates a circuit diagram of the light source device 50B according to the second embodiment. It should be noted that FIG. 9 corresponds to a drawing obtained by redrawing FIG. 4 using Formula 23.

As shown in the drawing, the light source device 50B is provided with a drive current calculation section 180 for calculating the drive current I (the signal Uk) supplied to the semiconductor laser 52. The drive current calculation section 180 is provided with a multiplier 181, an amplifier 182, and an adder 183. The multiplier 181 multiplies the signals D, Dapc2, and outputs the signal Dapc2·D. The amplifier 182 amplifies the signal Dapc2·D to H2/H1 times as large to output the signal H2/H1·Dapc2·D. The adder 183 adds the signal H2/H1·Dapc2·D and the signal Dapc1 to output the signal (Dapc1+H2/H1·Dapc2·D), namely the signal Uk (see Formula 15). It should be noted that the signal Uk corresponds to the signal u of the first embodiment.

As is understood from the explanations described above, in the first embodiment (FIG. 8), the threshold current estimator 150 estimates the threshold current Ith using the measured value (u) of the drive current I obtained by the drive current measurement section 160. In contrast, in the present embodiment, the threshold current estimator 150B estimates the threshold current Ith using the calculated value (Uk) of the drive current I obtained by the drive current calculation section 180.

The light source device 50B is further provided with a D/A converter 119 and an A/D converter 149. The D/A converter 119 performs a D/A (digital to analog) conversion on the signal Xk to output the signal Dapc1. The A/D converter 149 performs an A/D (analog to digital) conversion on the signal output from the I/V converter 140 to output the signal Yk. It should be noted that, as described above, since the rate of the temperature response of the semiconductor laser is several tens microseconds, it is sufficient to set the frequency of the sampling clock for the D/A converter 119, the A/D converter 149, and delay devices 281, 282 described later to about 1 MHz.

The threshold current estimator 150B includes five amplifiers 261-265, five computing units 271-275, and two delay devices 281 and 282.

The first delay device 281 delays the signal Xk+1^ to output the signal Xk^. The second delay device 282 delays the signal XOk+1^ to output the signal XOk^. It should be noted that the signal Xk^ and Xk+1^ correspond to the signal x^ of the first embodiment, and the signal XOk^ and the signal XOk+1^ corresponds to the signal α1^ of the first embodiment, shown in FIG. 8.

The first amplifier 261 amplifies the signal Uk β times to output the signal β·Uk. The first computing unit 271 subtracts the signal Xk^ and β·Uk from the signal XOk^ to output the signal (XOk^−Xk^−P·Uk). The second amplifier 262 amplifies the signal (XOk^−Xk^−β·Uk) Ts/τobs times as large to output the signal Ts/τobs·(XOk^−Xk^−β·Uk).

The third amplifier 263 amplifies the signal (Yk−Yk^) f·Ts/τobs times to output the signal f·Ts/τobs·(Yk−Yk^). The second computing unit 272 adds the signal X^ and the signal Ts/τobs (XOk^−Xk^−β·Uk) to each other, and subtracts the signal f·Ts/τobs·(Yk−Yk^) therefrom. As a result, the second computing unit 272 outputs the signal Xk+1^ represented by Formula 23.

The fourth amplifier 264 amplifies the signal (Yk−Yk^) f0·Ts/τobs times to output the signal f0−Ts/τobs·(Yk−Yk^). The third computing unit 273 subtracts the signal f0·Ts/τobs· (Yk−Yk^) from the signal XOk^. As a result, the third computing unit 273 outputs the signal XOk+1^ represented by Formula 23.

The fourth computing unit 274 subtracts the signal Xk^ from the signal Uk to output the signal (Uk−Xk^). The fifth amplifier 265 amplifies the signal (Uk−Xk^) M1 times to output the signal Yk^ represented by Formula 23.

The fifth computing unit 275 subtracts the signal Yk^ from the signal Yk to output the signal (Yk−Yk^).

As described above, since the threshold current estimator 150B uses the two state variables X and XO, the threshold current estimator 150B is provided with the first delay device 281 for delaying the signal Xk+1^ at the time point k+1 to generate the signal Xk^ at the time point k, and the second delay device 282 for delaying the signal XOk+1^ at the time point k+1 to generate the signal XOk^ at the time point k. The threshold current estimator 150B generates the signal Yk^ using the signals Uk, Xk^. Further, the threshold current estimator 150B generates the signal XOk+1^ to be provided to the second delay device 282 using the signal (Yk−Yk^) and the signal XOk^ output from the second delay device 282. Further, the threshold current estimator 150B generates the signal Xk+1^ to be provided to the first delay device 281 using the signal Uk, the signal (Yk−Yk^), the signal Xk^ output from the first delay device 281, and the signal XOk^ output from the second delay device 282.

As described above, by using the two state variables X, XO, the estimated value Xk^ of the threshold current can accurately be generated.

The light source device 50B further includes a comparator 191 and a selector 192. The comparator 191 compares the signal Yk^ with zero. When the signal Yk^ is equal to or greater than zero, the comparator 191 makes the selector 192 select the signal (Yk−Yk^). On the other hand, when the signal Yk^ is less than zero, the comparator 191 makes the selector 192 select the value of zero.

As described above, in the present embodiment, the comparator 191 and the selector 192 are used instead of the comparator 171 and the switch 172 of the first embodiment (FIG. 8). Also in the present embodiment, since the feed-back of the signal (Yk−Yk^) to the input of the threshold current estimator 150B is inhibited in the non-emission period using the comparator 191 and the selector 192, similar to the first embodiment, the threshold current estimator 150B can obtain the estimated value Xk^ of the threshold current in an open-loop manner.

It should be noted that the comparator 191 and the selector 192 in the present embodiment comprise an inhibit section.

Further, as explained in relation to the first embodiment, in the case in which the non-emission period is long, the error in the estimated value (Xk^) of the threshold current increases gradually. However, when the semiconductor laser 52 starts emitting light again, the threshold current estimator 150B can output the correct estimated value (Xk^). It should be noted that a certain recovery time is required before the threshold current estimator 150B outputs the correct estimated value (Xk^). Taking the recovery time into consideration, the semiconductor laser 52 is made preliminary emit light in the extra period T0 right before the effective period Tb as shown in FIG. 2. As described above, by making the semiconductor laser 52 preliminary emit light right before making the semiconductor laser 52 start significant emission, it becomes possible to obtain the estimated value Xk^ of the threshold current correctly right after the semiconductor laser 52 starts the significant emission.

Figures 1, 10B:
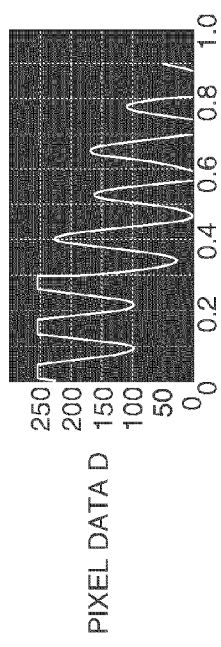
Figures 2, 10B:
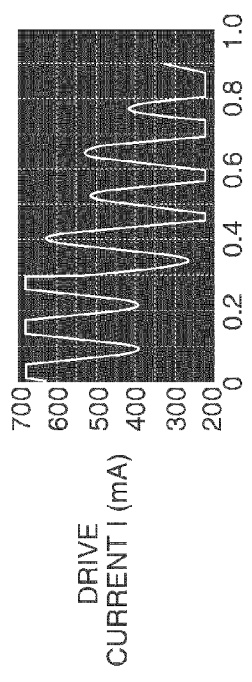
Figures 3, 10B:
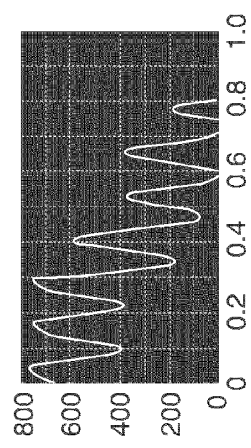

FIGS. 10A-1 to 10B-3 illustrates the result of a simulation of the operation of the light source device 50B of the second embodiment. FIGS. 10A-1 to 10A-3 illustrate the result of the operation of a light source device currently known in the art. FIG. 10A-1 shows the pixel data D, FIG. 10A-2 shows the drive current I, and FIG. 10A-3 shows the emission amount L. On the other hand, FIG. 10B-1 to FIG. 10B-3 show the result operation of the light source device 50B according to the present embodiment. FIGS. 10B-1 to 10B-3 correspond to FIGS. 10A-1 to 10A-3. Note that FIG. 10B-1 and FIG. 10A-1 are identical.

In FIGS. 10A-1 to 10A-3, the threshold current Ith is not estimated. Therefore, although the drive current I shown in FIG. 10A-2 varies almost similarly to the pixel data D shown in FIG. 10A-1, the emission amount L shown in the part FIG. 10A-3 does not vary similarly to the pixel data D shown in FIG. 10A-1.

In contrast, in the present embodiment, the threshold current Ith is estimated. Therefore, although the drive current I shown in FIG. 10B-2 does not vary similarly to the pixel data D shown FIG. 10B-1, the emission amount L shown in FIG. 10B-3 varies almost similarly to the pixel data D shown in FIG. 10B-1. Therefore, in the present embodiment, it is possible to make the profile of the emission amount shown in FIG. 10B-3 equivalent or substantially similar to the profile of the pixel data D, shown in FIG. 10B-1.

As explained hereinabove, also in the present embodiment, since the estimated value $\hat{Xk}$ of the threshold current is obtained similarly to the embodiment 1, and the drive current Uk determined using the pixel data D and the estimated value $\hat{Xk}$ of the threshold current is supplied to the semiconductor laser 52, it is possible to make the semiconductor laser 52 accurately emit the light having intensity (emission amount) corresponding to the pixel data D even when the actual threshold current varies due to the temperature variation.

It should be noted that the invention is not limited to the specific examples and the embodiments described above, but can be put into practice in various forms within the scope or the spirit of the invention. For example, the following modifications are also possible.

1. In the embodiments described above, for the sake of convenience of explanations, the projector PJ (FIG. 1) is provided with only one light source device 50. However, in reality, the projector may be provided with, for example, three light source devices for emitting three kinds of colored light beams and a combining optical system for combining the three kinds of colored light beams. Further, the combined light beam may be guided to the polygon mirror 62. As a result, a color image is displayed on the screen 70.

2. In the embodiments described above, the projector PJ is provided with the polygon mirror 62, and each of the line images included in the image displayed on the screen 70 are always drawn in same direction. However, a configuration may be adopted where the line images, which are included in the image displayed on the screen 70 and disposed adjacent to each other, may be drawn in opposite directions. It should be noted that such a projector is disclosed in, Japanese Patent Application No. JP-A-2006-227144. In this case, it is preferable to provide the extra period in which the preliminary emission of light is executed, right before each of the line images is drawn.

3. Although in the embodiments described above, the light source device according to the invention is applied in a raster scan type projector, the light source device can be applied to a projector provided with a variety of light modulation devices such as a liquid crystal panel or DMD (Digital Micromirror Device, a trademark of Texas Instruments) In this case, it is sufficient to provide a constant value as the signal D, for example.

Further, although in the embodiments descried above, the invention is applied to the projection type image display device, instead of this type of image display device, the invention can also be applied to a direct view type image display device.

4. Although in the embodiments described above, the light source devices 50 and 50B are used in a projector PJ, instead of the projector PJ, the light source devices can also be used in other optical devices such as processing equipment.

5. Although the light source devices 50 and 50B are provided with the semiconductor laser in the embodiments described above, it is also possible to provide the light source devices with other solid-state light sources such as a light emitting diodes (LED).

6. In the embodiments described above, it is possible to replace a part of the configuration realized by hardware with software, or to replace a part of the configuration realized by software with hardware.

What is claimed is:

1. A light source device comprising:
a semiconductor light emitting element for emitting light; and
a control section for controlling the semiconductor light emitting element in accordance with an input value received by the control section, the control section comprising:
a supply section for supplying the semiconductor light emitting element with a drive current, the drive current being based on the input value and an estimated threshold current of the semiconductor light emitting element, and
an estimation section for generating the estimated threshold current used by the supply section using the value of the drive current and a detected value related to the amount of light emitted from the semiconductor light emitting element,
wherein the estimation section obtains an estimation of the amount of light emitted from the semiconductor light emitting element using the amount of the drive current and the estimated threshold current, and feeds back an estimated threshold current to the estimation section comprising the difference between a detected emission amount and the estimated emission amount, wherein the control section further comprises an inhibit section for inhibiting the feed-back of the difference between the detected emission amount and estimated emission amount when the semiconductor light emitting element stops emitting light.

2. The light source device according to claim 1, wherein the supply section further comprises:
a first circuit for generating a threshold current portion of the drive current using the estimated value of the threshold current; and
a second circuit for generating a current portion of the drive current which exceeds the threshold current using the input value.

3. The light source device according to claim 1, wherein the estimation section comprises an observer, and the estimation section generates an estimated threshold current as an estimation of a first state variable.

4. The light source device according to claim 3, wherein the estimation section also generates another estimated value as an estimation of a second state variable.

5. The light source device according to claim 1, wherein the control section that causes the semiconductor light emitting element emit a preliminary pulse of light before causing the semiconductor light emitting element to emit light for a significant period of time.

6. The light source device according to claim 1, wherein the control section further comprises a measurement section for measuring the drive current used in the estimation section.

7. The light source device according to claim 1, wherein the control section further comprises a calculation section for calculating the drive current used in the estimation section.

8. An image display device comprising:
the light source device according to claim 1, wherein the input value comprises pixel data included in image data.

9. A method of controlling a semiconductor light emitting element in accordance with an input value, the method comprising:
supplying the semiconductor light emitting element with a drive current based on the input value and an estimation of a threshold current of the semiconductor light emitting element; and
generating the estimation of the threshold current used to supply the semiconductor light emitting element using the drive current and a detected amount of light emitted from the semiconductor light emitting element, wherein the estimation of the threshold current is obtained by estimating the amount of light emitted from the semiconductor light emitting element using the amount of the drive current and the estimated threshold current, and feeding back an estimated threshold current comprising the difference between a detected emission amount and the estimated emission amount; and
inhibiting the feedback of the difference between the detected emission amount and estimated emission amount when the semiconductor light emitting element stops emitting light.

10. A control section for controlling a semiconductor light emitting element in accordance with an input value, the control section comprising:
a supply section for supplying the semiconductor light emitting element with a drive current, the drive current being based on the input value and an estimated threshold current of the semiconductor light emitting element; and
an estimation section for generating the estimated threshold current used by the supply section using the value of the drive current and a detected value related to an amount of light emitted from the semiconductor light emitting element, wherein the estimation section obtains an estimation of the amount of light emitted from the semiconductor light emitting element using the amount of the drive current and the estimated threshold current, and feeds back an estimated threshold current to the estimation section comprising the difference between a detected emission amount and the estimated emission amount, wherein the control section further comprises an inhibit section for inhibiting the feed-back of the difference between the detected emission amount and estimated emission amount when the semiconductor light emitting element stops emitting light.

11. The control section according to claim 10, wherein the control section further comprises:
a first circuit for generating a threshold current portion of the drive current using the estimated value of the threshold current; and
a second circuit for generating a current portion of the drive current which exceeds the threshold current using the input value.

12. The control section according to claim 10, wherein the estimation section comprises an observer, and the estimation section generates an estimated threshold current as an estimation of a first state variable.

13. The control section according to claim 12, wherein the estimation section also generates another estimated value as an estimation of a second state variable.

14. The control section according to claim 10, wherein the control section that causes the semiconductor light emitting element emit a preliminary pulse of light before causing the semiconductor light emitting element to emit light for a significant period of time.

15. The control section according to claim 10, wherein the control section further comprises a measurement section for measuring the drive current used in the estimation section.

16. The control section according to claim 10, wherein the control section further comprises a calculation section for calculating the drive current used in the estimation section.

* * * * *